Figure 1:
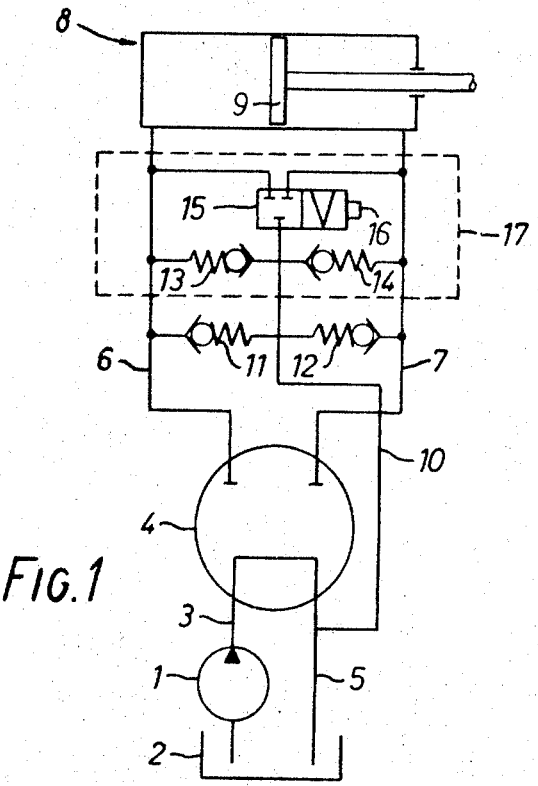

United States Patent [19]
Christensen

[11] 3,730,207
[45] May 1, 1973

[54] VALVE ARRANGEMENT FOR HYDRAULIC STEERING SYSTEMS

[75] Inventor: Thorkild Christensen, Nordborg, Denmark

[73] Assignee: Danfoss A/S, Nordborg, Denmark

[22] Filed: Oct. 4, 1971

[21] Appl. No.: 186,104

[30] Foreign Application Priority Data

Oct. 2, 1970  Germany..................P 20 48 421.3

[52] U.S. Cl..................137/106, 137/112, 91/437
[51] Int. Cl...............................................F15b 11/08
[58] Field of Search.................137/106, 112, 493.9, 137/625.5; 91/436, 437

[56] References Cited

UNITED STATES PATENTS

| | | | |
|---|---|---|---|
| 3,482,600 | 12/1969 | Hodgson | 91/436 X |
| 3,642,027 | 2/1972 | Rice | 91/437 X |
| 3,145,723 | 8/1964 | Chorkey | 137/112 |
| 1,529,384 | 3/1925 | Adams | 137/112 |

Primary Examiner—Robert G. Nilson
Assistant Examiner—Edward K. Look
Attorney—Wayne B. Easton

[57] ABSTRACT

The invention relates to a valve arrangement for hydraulic steering systems in which the two pipes supplying a working motor are connected to a control means and to each other by way of a manually operable short-circuiting valve and two suction non-return valves which act in opposite directions to each other and between which a compensating pipe branches off.

6 Claims, 2 Drawing Figures

VALVE ARRANGEMENT FOR HYDRAULIC STEERING SYSTEMS

The invention relates to a valve arrangement for hydraulic steering systems in which the two pipes supplying a working motor are connected to a control means and to each other by way of a manually operable short-circuiting valve and two suction non-return valves which act in opposite directions to each other and between which a compensating pipe branches off.

In hydraulic steering systems, the working motor is connected by way of pressure pipes to a control means which enables a pressure medium to be supplied through one pipe and discharged through the other as required, or vice versa. At the same time, the quantity of the pressurized medium to be passed to the working motor can generally be governed. In addition to this control means, a hydraulic steering system also requires further additional devices in order to be able to deal with certain situations.

These additional devices include a short-circuiting valve which connects the two sides of the working motor directly with each other so that the wheels to be deflected can follow the line of an external force without great resistance. This short-circuiting valve must be opened when the vehicle provided with the steering system is intended to be used as a trailer or is to be towed.

When, during normal travel, the wheels of the vehicle suffer heavy blows, due for example, to a stone on the road, the movable element of the working motor may be displaced. This causes pressurized medium to be displaced on one side, whereas reduced pressure occurs on the other side and this may lead to cavitation phenomena. The latter is avoided by providing suction non-return valves by way of which pressurized medium can be drawn from a compensating pipe and returned to that chamber of the working equipment in which the pressure is reduced. The compensating pipe is connected to the sump and/or, by way of pressure-relief valves, to the pipes supplying the working motor.

The large number of valves required and the associated pipe connexions render the construction of the steering system complicated and expensive, and a corresponding amount of space is required to accommodate them.

The object of the invention is to provide a valve arrangement with the aid of which space, expenditure of energy and costs may be reduced in a hydraulic steering system.

According to the invention and based on the initially mentioned valve arrangement, this object is achieved by providing, in a bore between the two supply pipes, a valve slide which bears by one of its end faces against a fixed seat and by its other end face against a manually displaceable seat and has at each of its two end faces a seat for the spring-loaded closure member of each of the suction non-return valves.

In this arrangement, the functions of the suction non-return valves and the short-circuiting valves are combined. If the displaceable seat for the slide is shifted, the short-circuiting function is achieved. Here, the suction valves form part of the short-circuit path. No special pipes are required for the short-circuiting valve. The space requirement is extremely small.

Expediently, the valve slide contains a co-axial passage, at the ends of which are formed the seats of the non-return valves, has outwardly projecting guide ribs on its circumference, and contains a transverse passage at the middle, and the compensating pipe runs off from the circumference of the bore in the same area as that in which the transverse passage is located. Furthermore, by manually actuating the displaceable valve seat, pressurized medium can be caused to flow along the circumference of the slide.

The valve slide may be of conical form at both ends in order to provide a particularly good seal with the associated seats.

The closure members of the non-return valves are expediently accommodated in recesses in the end faces of the valve slide. In this position they are protected. Furthermore, a construction that is short in the axial direction is obtained.

Moreover, the adjustable valve seat can be formed on a collet which is secured against rotation and is mounted on a screw which is secured against axial movement and is rotatable from the outside. The valve seat is displaced by simply rotating the screw.

Manufacture is facilitated if a helical compression spring, in frictional engagement with the circumferential wall of the bore, is accommodated in a circumferential groove in the collet. The friction between the helical compression spring and the circumferential wall is great enough to prevent rotation of the collet but is not sufficient to prevent axial displacement of the collet.

Figure 2:
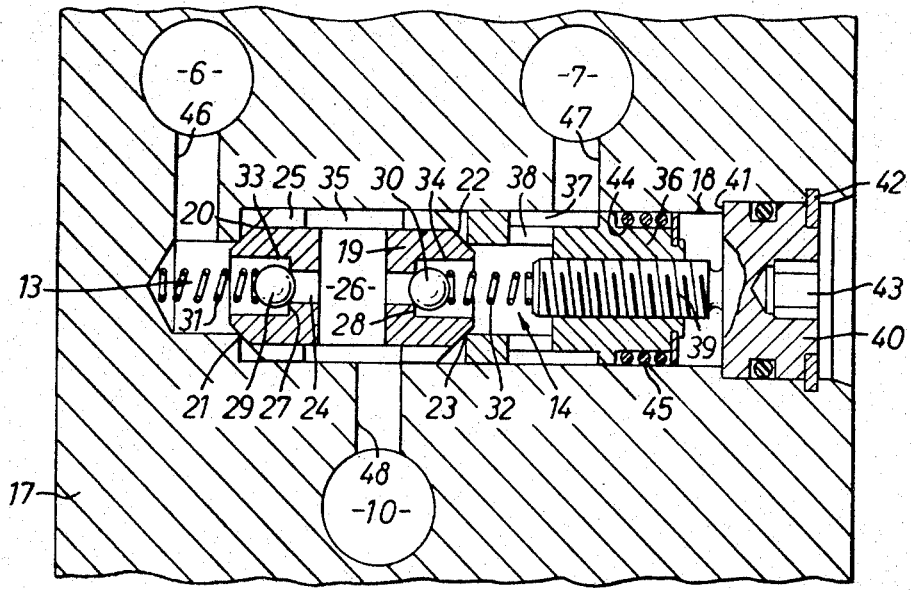

The invention will now be described in greater detail by reference to an embodiment illustrated in the drawing, in which:

FIG. 1 shows the simplified circuit diagram of a hydraulic steering system incorporating the valve arrangement of the invention, and FIG. 2 is a section through one form of construction of the valve arrangement of the invention.

Referring to FIG. 1, a pump passes pressurized fluid from a sump 2 to a control means 4 by way of a pump line 3. When said means is in the neutral position, the pressurized fluid is returned directly to this sump through the sump pipe 5. The control means 4 is connected to a working motor 8 by way of two supply pipes 6 and 7, the piston 9 of the motor acting on the steering suspension. Depending upon the position of the control means 4, pressurized fluid may be passed through the supply pipe 6 to the working motor 8, and discharge fluid may be passed to the sump through the pipe 7, or vice versa.

Connected to the sump pipe 5 is a compensating pipe 10. This communicates with each of the two supply pipes 6 and 7 by way of excess-pressure valves 11 and 12 respectively. It is also connected to each of the supply pipes by way of suction non-return valves 13 and 14 respectively. Furthermore, a short-circuiting valve 15 is fitted between the two supply pipes and this can be manually adjusted by means of an actuating member 16 and it then establishes direct connexion between the supply pipes 6 and 7.

When the the control means 4 is in the neutral position and the short-circuiting valve 15 is opened, the piston 9 of the working motor 8 can be reciprocated without the use of great external force. If however the short-circuiting valve is closed and the steering suspension suffers an impact whereby the piston is positively displaced, then the displaced pressurized medium is enabled to pass through an excess-pressure valve 11 or 12 to the compensating pipe 10, whereas the vacuum on the other side of the piston draws in pressurized medium by way of the suction non-return valves 13 or 14.

The valve arrangement of the invention is accommodated in a part 17 which is shown in section in FIG. 2 and is indicated in broken lines in FIG. 1. This part contains a bore 18 in which is located a valve slide 19. One of the oblique end-faces 20 of this slide bears against a fixed valve seat 21 while its other oblique end face 22 bears against a displaceable seat 23. The valve slide also contains a co-axial longitudinal passage 24, has guide ribs 25 on its circumference, and contains a transverse passage 26. Located at the ends of the co-axial passage 24 are seats 27 and 28 for the closure members of the suction non-return valves 13 and 14, which members take the form of spheres 29 and 30. These spheres are loaded by springs 31 and 32. They are located in recesses 33 and 34 in the end faces of the slide 19. A circumferential passage 35 is left between the slide and the bore 18.

The displaceable valve seat 23 is formed on a collet 36 which contains a circumferential recess 37 and radial bores 38. The collet has an internal screw-thread and is held on a screw 39, the head 40 of which is secured against movement in the axial direction with the aid of a shoulder 41 and a circlip 42. To enable it to be displaced, the screw contains a hexagonal recess 43. A helical compression spring 45, which is in frictional engagement with the bore 18, is located in a circumferential groove 44 in the collet.

The turning of the head 40 with a screw driver would not cause the collet 36 to move in the bore if the friction created by spring 45 were not present. The presence of the friction from the spring causes the collet 36 to be held in the bore and the turning of the screw 39 thus causes the collet 36 to move left or right.

From the lines 6, 7 and 10 which take the form of bores, there extend transverse bores 46, 47 and 48 which run to the bore 18; here, the transverse bores 46 and 47 terminate beyond the end faces of the slide 19, whereas the transverse bore 48 terminates near the median transverse bore 26 in the slide.

In the position illustrated, the valve arrangement acts as a double suction non-return valve. Negative pressure in the pipe 6 opens the non-return valve 13, and negative pressure in the pipe 7 opens the non-return valve 14, so that pressurized medium is enabled to flow in from the compensating pipe 10.

When the screw 39 is turned with the aid of a tool, the collet 36 moves to the right. The valve slide 19 can now be moved in the axial direction. When excess pressure obtains in the pipe 7, the slide 19 remains in the position illustrated. Pressurized fluid passes from the pipe 7, by way of the circumferential passage 35, the transverse passage 26 and the co-axial passage 24, to the non-return valve 13 and lifts this, so that direct communication between the supply pipes 7 and 6 is established. When, conversely, excess pressure obtains in the supply pipe 6, the slide 19 is pushed to the right against the seat 28. Pressurized fluid then once more flows, through the circumferential passage 35, the transverse passage 26 and the co-axial passage 24, and lifts the non-return valve 14, so that direct communication between the passages 6 and 7 is established.

The part 17 preferably takes the form of a plate which is connected directly to the control means.

I claim:

1. A valve assembly for a hydraulic steering system comprising a valve body having parallel arranged first and second passages and a common drain passage, said valve body having a bore connecting said first and second passages, said common drain having fluid communication with said bore, a main valve slidably disposed in said bore, an abutment member in said bore having a valve seat formed thereon which is engageable with said valve, said abutment member being selectively movable to a first position for holding said valve in a fixed position and movable to a second position to allow movement of said valve, said valve being movable when said abutment member is in said second position, said valve being movable to connect either said first passage or said second passage with said drain passage, the movement of said valve being responsive to pressurized fluid in either said first passage or said second passage.

2. A valve assembly according to claim 1 characterized in that said main valve has a central longitudinally extending passage with outwardly opening non-return valves at opposite ends thereof, said main valve having outwardly projecting guide ribs on its circumference and a transversely extending passage intersecting said longitudinally extending passage, said transversely extending passage having fluid communication with said drain passage.

3. A valve assembly according to claim 1 characterized in that said valve has a conical form at one end thereof engageable with said abutment member valve seat.

4. A valve assembly according to claim 2 characterized in that said main valve has recesses at opposite ends thereof in which said non-return valves are disposed.

5. A valve assembly according to claim 1 characterized in that said abutment member has the form of a collet which is secured against rotation, screw means engageable with said collet to move it in an axial direction, and means to allow manual rotation of said screw means.

6. A valve assembly according to claim 5 characterized in that a helical compression spring is in frictional engagement with the circumferential wall of said bore and is fitted in a circumferential groove in said collet.

* * * * *